(12) United States Patent
Saiki

(10) Patent No.: US 10,841,463 B2
(45) Date of Patent: Nov. 17, 2020

(54) IMAGING DEVICE WITH TWO-STAGE DIAL

(71) Applicant: Panasonic Intellectual Property Management Co., Ltd., Osaka (JP)

(72) Inventor: Jun Saiki, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 135 days.

(21) Appl. No.: 16/135,559

(22) Filed: Sep. 19, 2018

(65) Prior Publication Data

US 2019/0098181 A1 Mar. 28, 2019

(30) Foreign Application Priority Data

Sep. 26, 2017 (JP) .................................. 2017-185168

(51) Int. Cl.
*H04N 5/225* (2006.01)
*G03B 17/00* (2006.01)

(52) U.S. Cl.
CPC ........... *H04N 5/2251* (2013.01); *G03B 17/00* (2013.01); *G03B 2217/002* (2013.01)

(58) Field of Classification Search
None
See application file for complete search history.

(56) References Cited

U.S. PATENT DOCUMENTS

| | | | | |
|---|---|---|---|---|
| 4,853,726 A | * | 8/1989 | Kawamura | G03B 17/18 396/299 |
| 5,950,035 A | * | 9/1999 | Sakamoto | G03B 17/00 116/305 |
| 6,067,424 A | * | 5/2000 | Shono | G03B 17/00 200/336 |
| 6,610,937 B2 | * | 8/2003 | Yamaguchi | H01H 25/008 200/11 R |
| 8,363,159 B2 | * | 1/2013 | Hyodo | H04N 5/2252 348/373 |
| 9,667,844 B2 | * | 5/2017 | Doshin | H04N 5/2252 |
| 2002/0012536 A1 | * | 1/2002 | Kawano | G03B 17/18 396/287 |

(Continued)

FOREIGN PATENT DOCUMENTS

| | | |
|---|---|---|
| JP | 2004-327218 | 11/2004 |
| JP | 2013-130668 | 7/2013 |
| JP | 2015-075594 | 4/2015 |

*Primary Examiner* — Cynthia Segura
(74) *Attorney, Agent, or Firm* — Renner, Otto, Boisselle & Sklar, LLP

(57) ABSTRACT

An imaging device includes a body case formed with a through-hole that extends in a vertical direction, a substrate disposed below the through-hole and fixed to the body case, a support portion disposed inside the through-hole, a lower dial supported to the support portion so as to be rotatable about a rotation axis parallel to the vertical direction, and an upper dial supported to the support portion so as to be rotatable about the rotation axis independently of the lower dial. The support portion has a connection portion that constitutes a part of an outer periphery of the support portion and that is connected to the body case, and a fixing portion disposed to protrude downward on a side opposite to the connection portion across the rotation axis, wherein the support portion is fixed to the substrate via the fixing portion.

14 Claims, 12 Drawing Sheets

(56) References Cited

U.S. PATENT DOCUMENTS

| | | | | |
|---|---|---|---|---|
| 2002/0144882 A1* | 10/2002 | Yamaguchi | .......... | H01H 25/008 200/4 |
| 2004/0091260 A1* | 5/2004 | Kobayashi | ............ | G03B 17/00 396/543 |
| 2010/0060782 A1* | 3/2010 | Hyodo | ................... | G03B 17/00 348/373 |
| 2014/0072294 A1* | 3/2014 | Himeno | ................. | H03K 17/78 396/543 |
| 2016/0057321 A1* | 2/2016 | Yamaura | ............. | H04N 5/2251 348/373 |
| 2016/0065800 A1* | 3/2016 | Doshin | ................ | H04N 5/2252 348/376 |
| 2017/0126942 A1* | 5/2017 | Yamamoto | ........... | H04N 5/2253 |

* cited by examiner

IMAGING DEVICE WITH TWO-STAGE DIAL

BACKGROUND

1. Technical Field

The present disclosure relates to an imaging device equipped with a two-stage dial having a vertical two-stage structure.

2. Description of the Related Art

Imaging devices of the kind described above are conventionally equipped with an upper dial and a lower dial which are independently rotatable about the same rotation axis (for example, PTL 1: Unexamined Japanese Patent Publication No. 2015-75594).

SUMMARY

Conventional imaging devices are demanded to be downsized. The present disclosure aims to address the foregoing problem, and to achieve reduction in size of an imaging device having an upper dial and a lower dial.

An imaging device according to the present disclosure includes a body case formed with a through-hole that extends in a vertical direction, a substrate disposed below the through-hole and fixed to the body case, a support portion disposed inside the through-hole, a lower dial supported to the support portion so as to be rotatable about a rotation axis parallel to the vertical direction, and an upper dial supported to the support portion so as to be rotatable about the rotation axis independently of the lower dial.

The support portion has a connection portion that constitutes a part of an outer periphery of the support portion and that is connected to the body case, and a fixing portion disposed to protrude downward on a side opposite to the connection portion across the rotation axis. The support portion is fixed to the substrate via the fixing portion Further, an imaging device according to the present disclosure includes a body case formed with a through-hole that extends in a vertical direction, a support portion disposed inside the through-hole, a lower dial supported to the support portion so as to be rotatable about a rotation axis parallel to the vertical direction, an upper dial supported to the support portion so as to be rotatable about the rotation axis independently of the lower dial, and a first click member that extends in a direction orthogonal to the rotation axis and that provides a click feeling with the rotation of the lower dial.

The lower dial has an annular part having an opening, and a cylindrical part extending downward from an outer peripheral part of the annular part. The annular part is formed with a first recess in an inner peripheral part for locally increasing a diameter of the opening. The support portion is formed with a first groove in an upper surface. The first click member is housed in the first groove so as to be brought into contact with an inner peripheral surface of the cylindrical part of the lower dial.

According to the present disclosure, reduction in size of the imaging device can be achieved.

DETAILED DESCRIPTION

Figure 1:
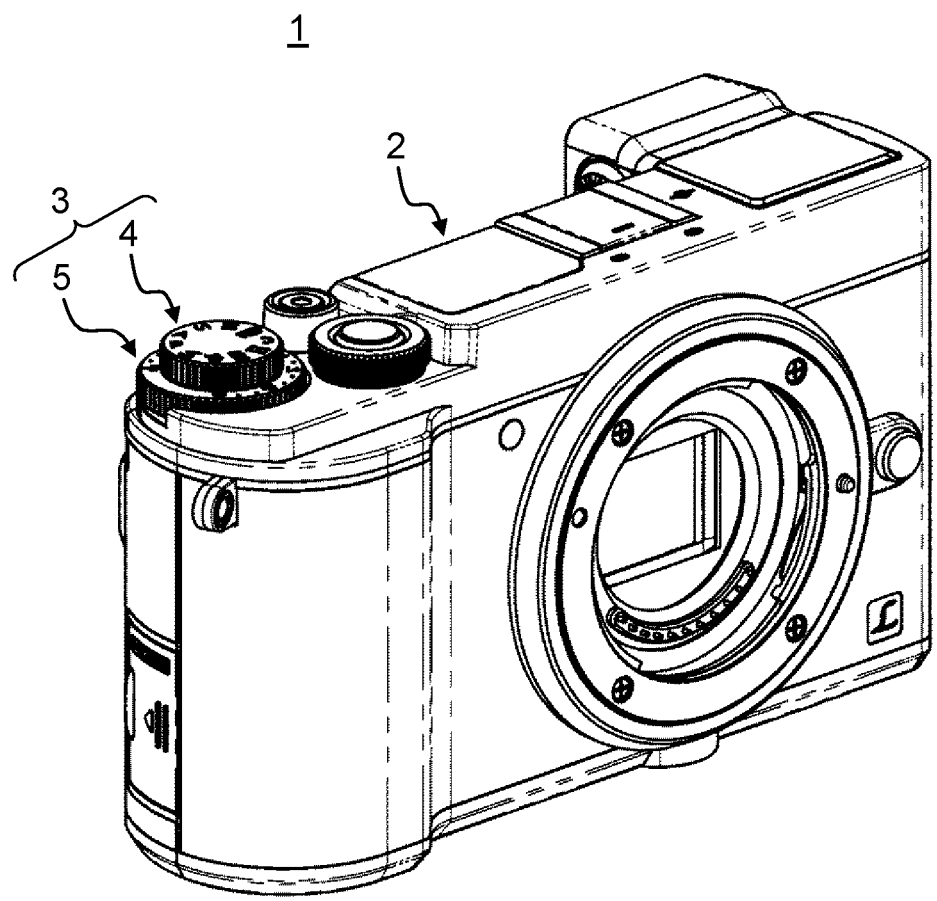
FIG. 1 is a perspective view of an imaging device, as viewed from front, according to an exemplary embodiment.

An imaging device according to a first aspect of the present disclosure includes:
- a body case formed with a through-hole that extends in a vertical direction;
- a substrate that is disposed below the through-hole and fixed to the body case;
- a support portion disposed inside the through-hole;
- a lower dial supported to the support portion so as to be rotatable about a rotation axis parallel to the vertical direction; and
- an upper dial disposed over the lower dial and supported to the support portion so as to be rotatable about the rotation axis independently of the lower dial, wherein the support portion includes a connection portion that constitutes a part of an outer periphery of the support portion and is connected to the body case, and a fixing portion that is disposed to protrude downward on a side opposite to the connection portion across the rotation axis, the support portion is fixed to the substrate via the fixing portion.

According to a second aspect of the present disclosure, in the imaging device in the first aspect, the body case and the support portion are integrally formed from a resin material.

According to a third aspect of the present disclosure, the imaging device in the first or second aspect further includes a rotating body that is disposed between the support portion and the substrate and that rotates integrally with the lower dial about the rotation axis, wherein the rotating body has a contact portion that is slidable on a pattern formed in the substrate when the rotating body rotates about the rotation axis.

According to a fourth aspect of the present disclosure, in the imaging device in the third aspect, a portion of the pattern is formed at a position overlapping the connection portion in a plan view.

According to a fifth aspect of the present disclosure, in the imaging device in the third or fourth aspect, the rotating body has an arc-shaped opening part centered around the rotation axis, and the fixing portion relatively moves in the arc-shaped opening part with the rotation of the rotating body.

According to a sixth aspect of the present disclosure, in the imaging device in the fifth aspect, the rotating body includes a connection part disposed concentric with the arc-shaped opening part, and the contact portion is provided to protrude downward from a lower surface of the connection part of the rotating body.

According to a seventh aspect of the present disclosure, in the imaging device in any one of the fourth to sixth aspects, the lower dial has an engaging portion, the rotating body has an engaged portion provided on a side opposite to the contact portion across the rotation axis, and the engaging portion and the engaged portion are engaged with each other through an arc-shaped opening portion which is a part of the through-hole and which is formed around an outer periphery of the support portion except for the connection portion of the support portion.

According to an eighth aspect of the present disclosure, the imaging device in any one of the first to seventh aspects further includes a click member that provides a click feeling with the rotation of the lower dial, wherein the click member extends in a direction orthogonal to the rotation axis so as to be brought into contact with an inner peripheral surface of the lower dial.

An imaging device according to a ninth aspect of the present disclosure includes:

a body case formed with a through-hole that extends in a vertical direction;

a support portion disposed inside the through-hole;

a lower dial supported to the support portion so as to be rotatable about a rotation axis parallel to the vertical direction;

an upper dial disposed over the lower dial and supported to the support portion so as to be rotatable about the rotation axis independently of the lower dial; and a first click member that extends in a direction orthogonal to the rotation axis and provides a click feeling with the rotation of the lower dial, wherein the lower dial has an annular part having an opening, and a cylindrical part extending downward from an outer peripheral part of the annular part, the annular part is formed with a first recess in an inner peripheral part for locally increasing a diameter of the opening, the support portion is formed with a first groove in an upper surface, and the first click member is housed in the first groove so as to be brought into contact with an inner peripheral surface of the cylindrical part of the lower dial.

According to a tenth aspect of the present disclosure, the imaging device in the ninth aspect further includes a second click member that extends in the direction orthogonal to the rotation axis and provides a click feeling with the rotation of the lower dial, wherein the lower dial is formed with a second recess in the inner peripheral part of the annular part for locally increasing the diameter of the opening, the support portion is formed with a second groove in the upper surface, and the second click member is housed in the second groove so as to be brought into contact with the inner peripheral surface of the cylindrical part of the lower dial.

According to an eleventh aspect of the present disclosure, in the imaging device in the tenth aspect, the first groove and the second groove are formed at positions facing each other across the rotation axis, and the first recess and the second recess are formed at positions facing each other across the rotation axis.

According to a twelfth aspect of the present disclosure, in the imaging device in the ninth aspect, the first recess has a width larger than a width of the first click member.

According to a thirteenth aspect of the present disclosure, in the imaging device in the ninth aspect, a retainer is disposed over the opening of the annular part, and the retainer has, on a lower surface, a protrusion to be fitted into the first groove.

According to a fourteenth aspect of the present disclosure, the imaging device in the ninth aspect further includes a third click member that extends in the vertical direction and provides a click feeling with the rotation of the upper dial.

An exemplary embodiment will now be described in detail with reference to the drawings as appropriate. However, detailed descriptions more than necessary may be omitted. For example, detailed descriptions of well-known matters and duplicate descriptions of substantially identical configurations may be omitted. This is to avoid unnecessarily redundancy in the following description, and to facilitate understanding by those skilled in the art.

The attached drawings and the following description are provided for those skilled in the art to fully understand the present disclosure, and are not intended to limit the subject matter as described in the appended claims.

In the following description, terms indicating directions such as "upper", "lower", "front", and "rear" are used based on a state in normal use for convenience in description. However, these terms do not limit a use state or the like of the imaging device according to the present disclosure.

Exemplary Embodiment

Figure 2:
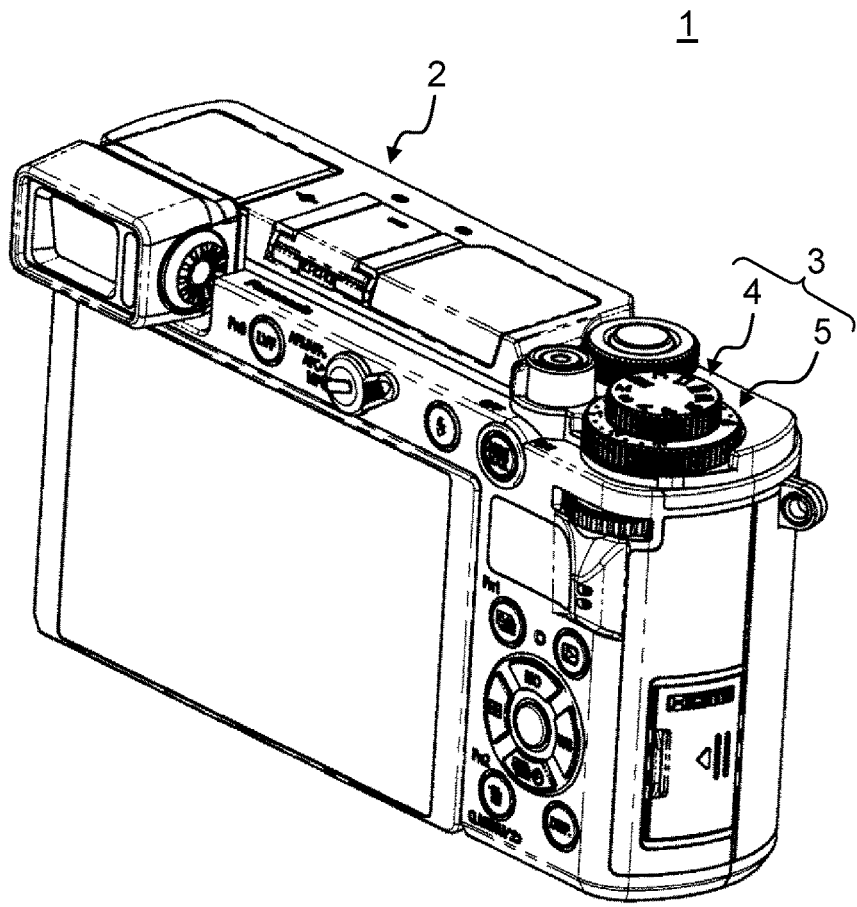
FIG. 2 is a perspective view of the imaging device, as viewed from rear, according to the exemplary embodiment.

FIG. 1 is a perspective view of the imaging device, as viewed from front, according to the exemplary embodiment. FIG. 2 is a perspective view of the imaging device, as viewed from rear, according to the exemplary embodiment. The imaging device according to the exemplary embodiment is a digital camera.

As illustrated in FIGS. 1 and 2, imaging device 1 according to the present exemplary embodiment has two-stage dial 3 having a vertical two-stage structure on top of body case 2. Two-stage dial 3 includes upper dial 4 and lower dial 5 which are independently rotatable. The configurations other than two-stage dial 3 are not particularly limited and similar to configurations of well-known imaging devices, and thus, will not be described in detail below.

Figure 3:
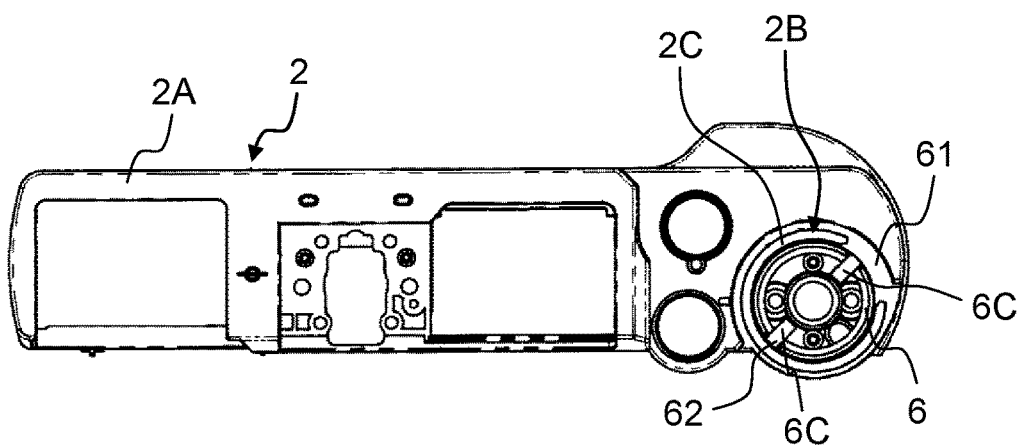
FIG. 3 is a top view of a body case of the imaging device illustrated in FIG. 1.

FIG. 3 is a top view of body case 2. In the exemplary embodiment, body case 2 has cover member 2A that constitutes an upper part of body case 2. Two-stage dial 3 is attached to cover member 2A in a rotatable manner.

As illustrated in FIG. 3, cover member 2A can be mounted with various components such as an internal electronic flash, an electronic viewfinder (EVF), a power button, a shutter button, and a zoom lever. Cover member 2A also has circular through-hole 2B which is formed to extend in a vertical direction in a part of cover member 2A (right side in FIG. 3).

Support portion 6 is disposed inside through-hole 2B. Support portion 6 supports upper dial 4 and lower dial 5 in a rotatable manner. A rotation axis of upper dial 4 and a rotation axis of lower dial 5 coincide with each other. Hereinafter, the rotation axes of upper dial 4 and lower dial 5 are referred to as rotation axes R. Through-hole 2B has a size enough for including inside support portion 6 in a plan view. Support portion 6 is formed as an island floating in through-hole 2B. A part of an outer periphery of support portion 6 constitutes connection portion 61. Support portion 6 is connected to body case 2 with connection portion 61 in a cantilever fashion. The other part of the outer periphery of support portion 6 is brought into contact with arc-shaped opening portion 2C. Opening portion 2C is a hole excluding support portion 6 and connection portion 61 from through-hole 2B in a plan view. The center angle of opening portion 2C is 180 degrees or more (for example, 270 degrees). In the exemplary embodiment, body case 2 and support portion 6 are integrally formed from a resin material.

Figure 4:
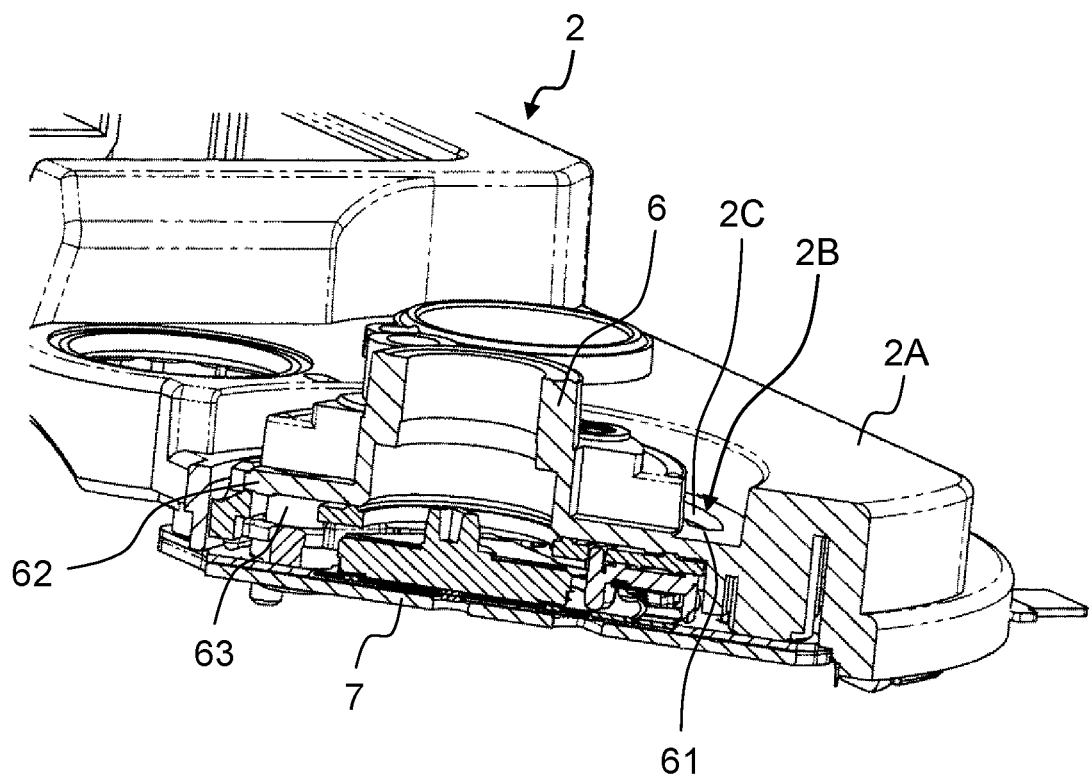
FIG. 4 is a partially sectional perspective view illustrating a support portion and a connection portion.

FIG. 4 is a partially sectional perspective view illustrating support portion 6 and connection portion 61.

As illustrated in FIG. 4, substrate 7 is disposed below support portion 6. Substrate 7 is fixed to body case 2. Support portion 6 has free end 62 located at a side opposite to connection portion 61 across the rotation axes of upper dial 4 and lower dial 5. Support portion 6 includes boss 63 (an example of a fixing portion) provided to protrude downward from free end 62. Support portion 6 is fixed to substrate 7 via boss 63. Specifically, support portion 6 is integrated with body case 2 via substrate 7 so as not to be displaced with respect to body case 2. As illustrated in FIG. 3, a pair of grooves 6C (examples of a first groove and a second groove) is formed in an upper surface of support portion 6. Grooves 6C are formed at positions facing each other across rotation axis R. Long axes of grooves 6C extend in a direction orthogonal to rotation axis R. The long axes of grooves 6C are parallel to the diameter of through-hole 2B centered around rotation axis R.

Figure 5:
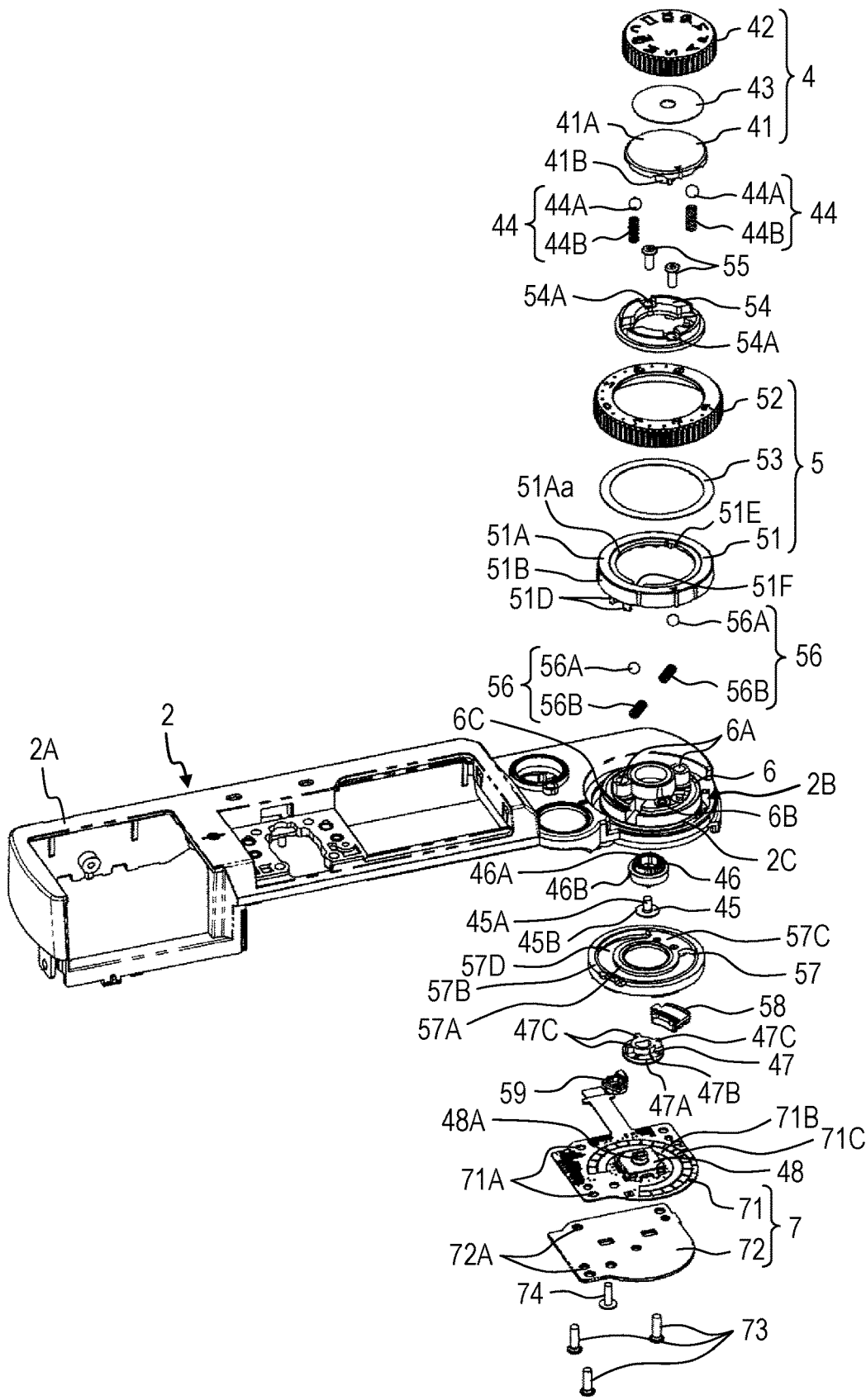
FIG. 5 is an exploded perspective view of components related to a two-stage dial included in the imaging device illustrated in FIG. 1, as viewed from diagonally above.
Figure 6:
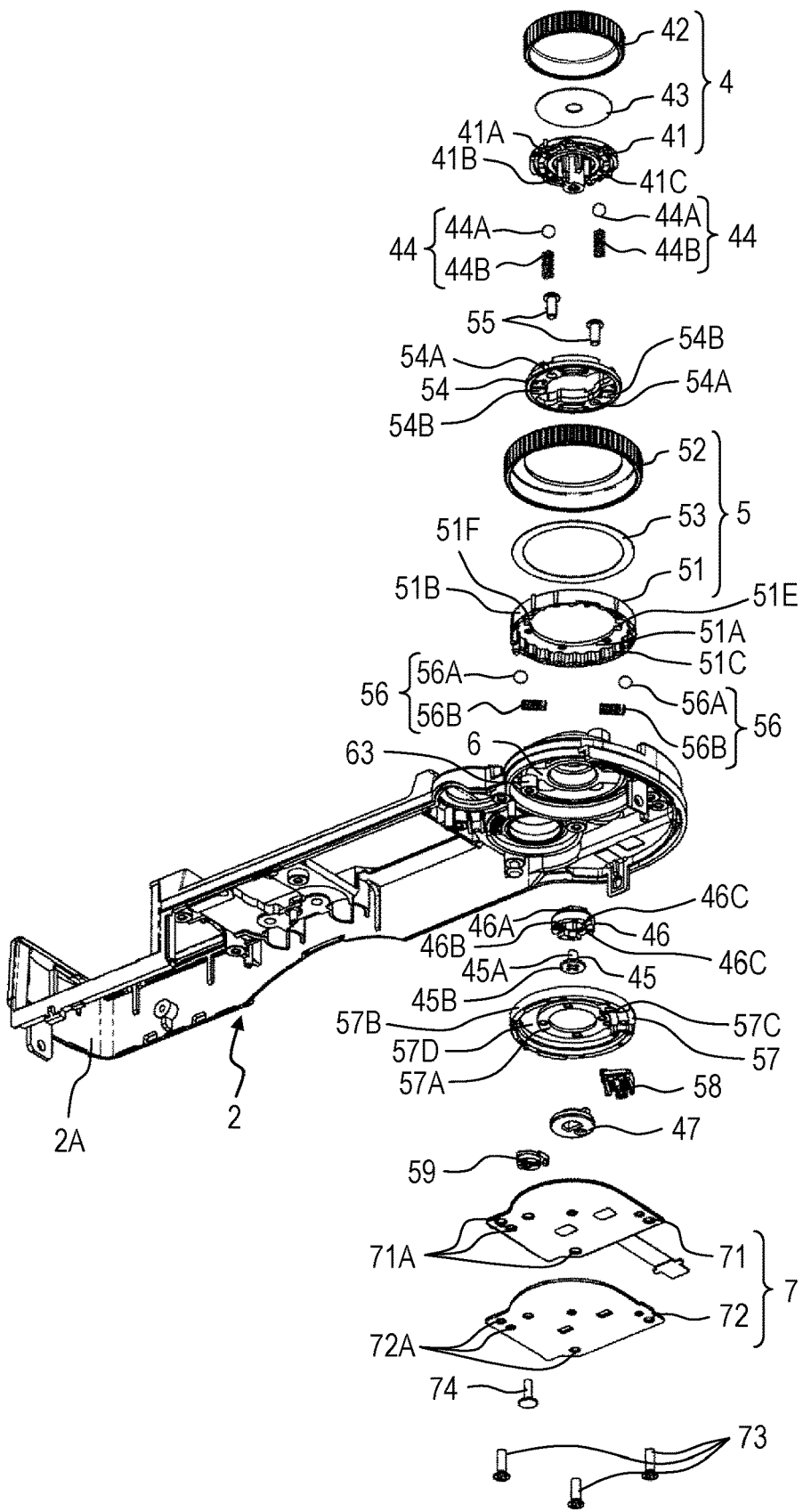
FIG. 6 is an exploded perspective view of the components related to the two-stage dial included in the imaging device illustrated in FIG. 1, as viewed from diagonally below.
Figure 7:
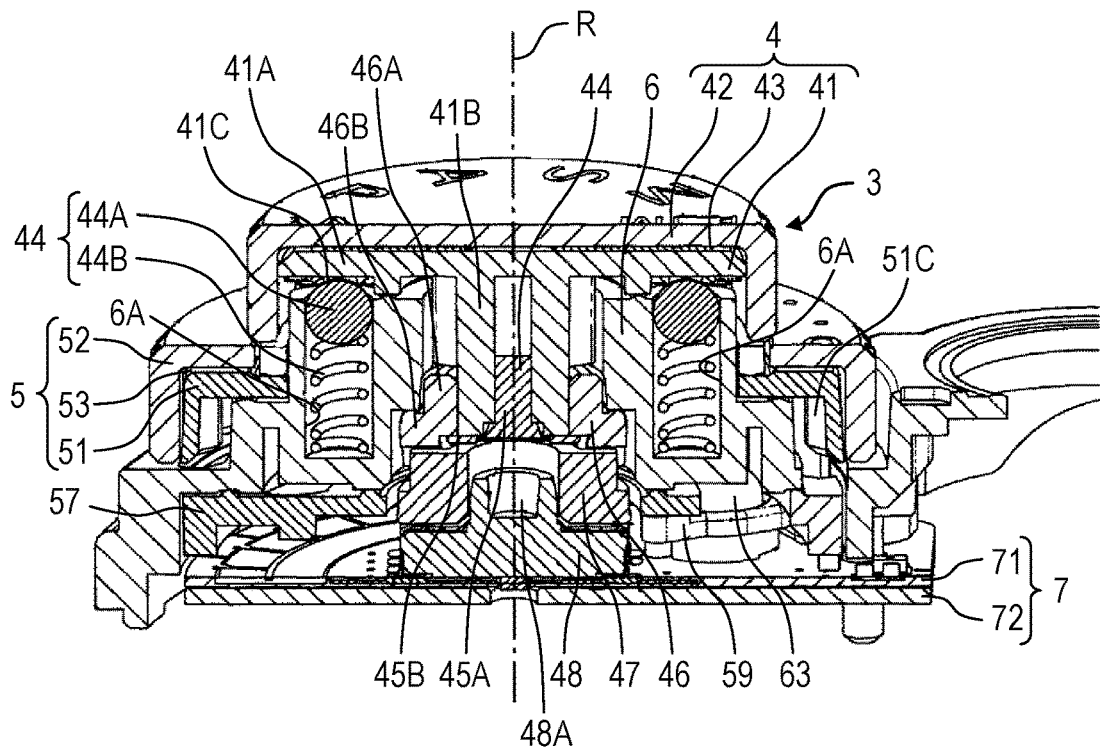
FIG. 7 is a partially sectional perspective assembly view of the components related to the two-stage dial included in the imaging device illustrated in FIG. 1.
Figure 8:
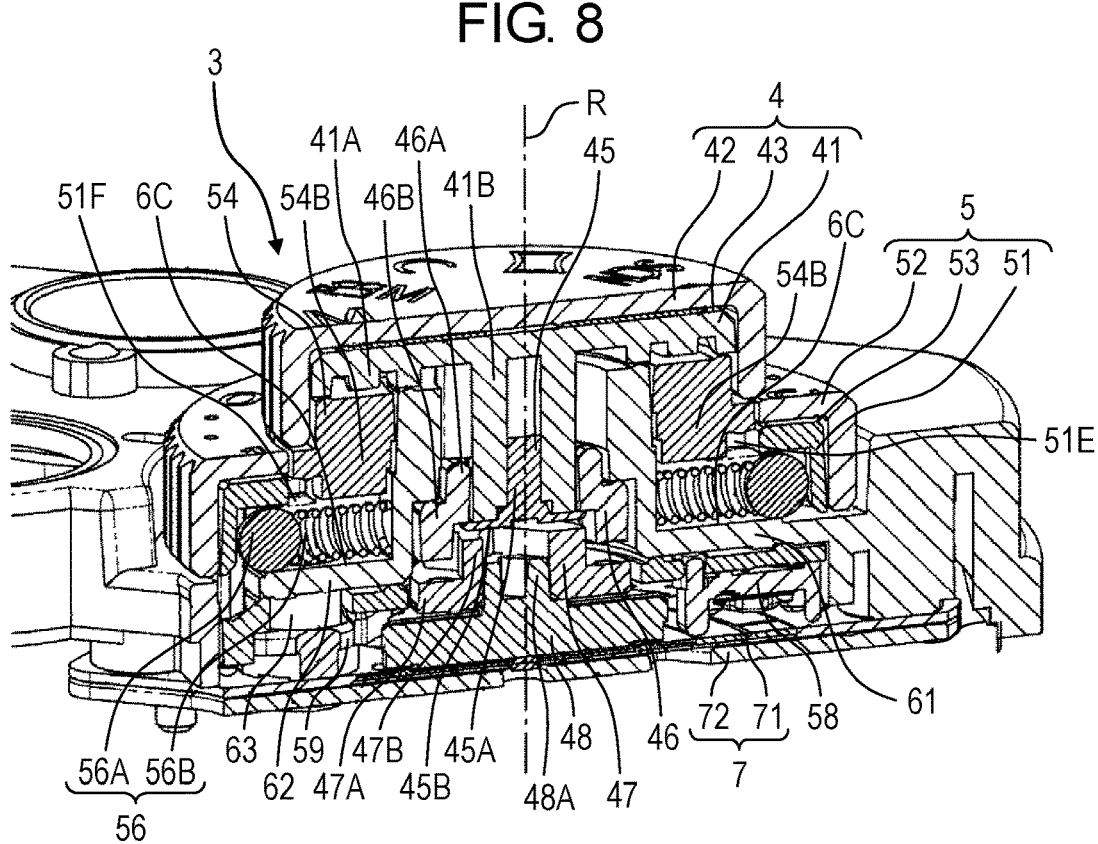
FIG. 8 is a partially sectional perspective assembly view of the components related to the two-stage dial included in the imaging device illustrated in FIG. 1.
Figure 9:
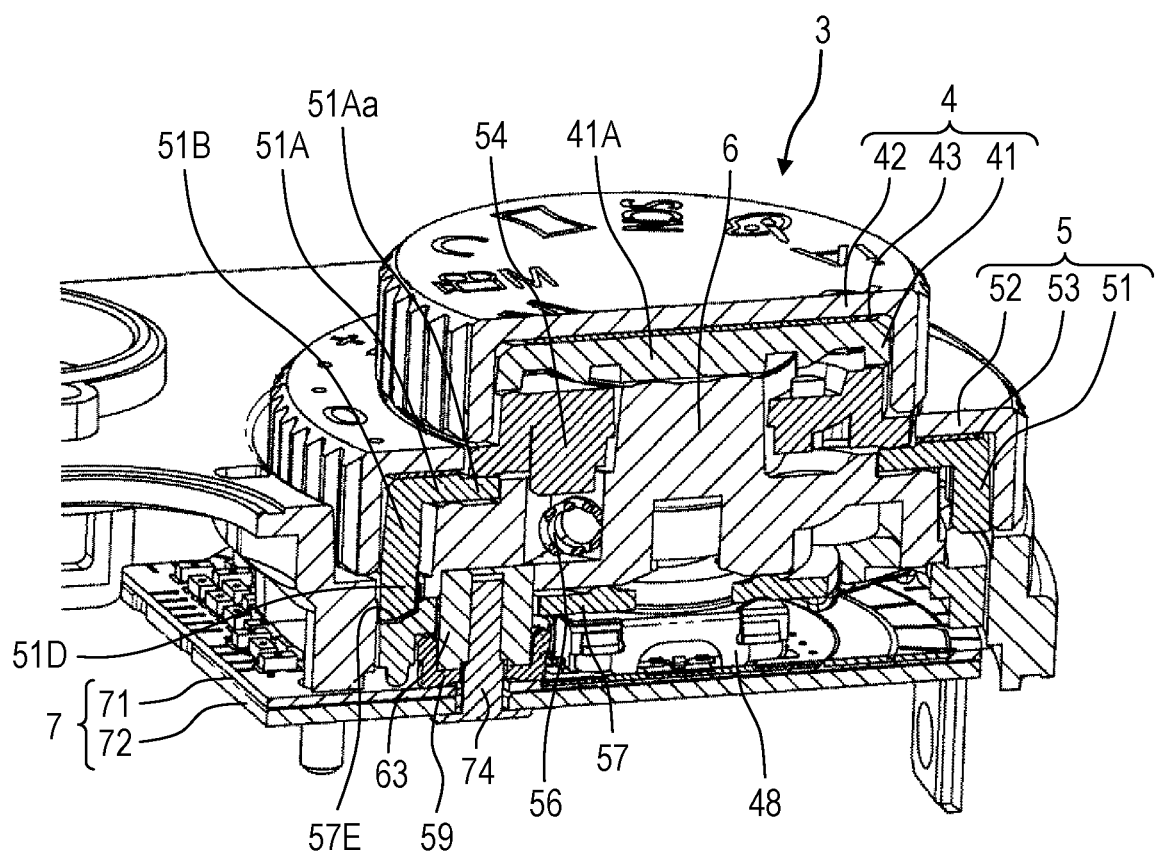
FIG. 9 is a partially sectional perspective assembly view of the components related to the two-stage dial included in the imaging device illustrated in FIG. 1.

FIG. 5 is an exploded perspective view of components related to two-stage dial 3 as viewed from diagonally above. FIG. 6 is an exploded perspective view of the components related to two-stage dial 3 as viewed from diagonally below. FIGS. 7 to 9 are partially sectional perspective assembly views of the components related to two-stage dial 3.

First, components related to upper dial 4 will be described.

As illustrated in FIGS. 7 and 8, upper dial 4 is rotatable about rotation axis R passing through a central part of through-hole 2B illustrated in FIG. 3 in the vertical direction. Upper dial 4 is used for selecting various modes, for example, and rotatable by 360 degrees.

Upper dial 4 includes dial member 41, dial cap 42, and double-sided tape 43.

Dial member 41 has disk part 41A and cylindrical part 41B having an outer diameter smaller than that of disk part 41A. Centers of disk part 41A and cylindrical part 41B are on rotation axis R. In other words, disk part 41A and cylindrical part 41B are coaxially disposed.

An upper surface of disk part 41A is attached to a lower surface of dial cap 42 via double-sided tape 43. Thus, dial member 41 and dial cap 42 are integrated. Dial cap 42 is disposed to cover dial member 41. A plurality of symbols or characters indicating various modes, for example, are printed on an upper surface of dial cap 42 in a circumferential direction.

As illustrated in FIG. 6, corrugated part 41C that has alternate ridges and valleys being continuously formed in the circumferential direction is formed on the lower surface of disk part 41A. As illustrated in FIG. 7, a pair of click members 44 is disposed to be brought into contact with corrugated part 41C. Click members 44 are disposed at positions facing each other across rotation axis R.

Click members 44 provide a click feeling with the rotation of upper dial 4. The click feeling is provided by a change in resistance force with respect to force provided by a user to rotate upper dial 4. Click members 44 are disposed to extend in a direction parallel to rotation axis R. More specifically, click members 44 are housed in cylindrical recess parts 6A (see FIG. 5) formed in support portion 6. Cylindrical recess parts 6A are open at the top. Long axes of cylindrical recess parts 6A extend in a direction parallel to rotation axis R.

Each click member 44 has ball 44A and spring 44B. Ball 44A is disposed on spring 44B. Ball 44A is disposed while being biased from below by spring 44B so as to be brought into contact with corrugated part 41C. When upper dial 4 rotates, balls 44A are pressed by corrugated part 41C to vertically move. With the vertical movement of balls 44A, biasing force given to balls 44A by springs 44B changes. Thus, click members 44 provide the click feeling to the user.

An upper end of cylindrical part 41B is connected to the lower surface of disk part 41A. Screw 45 which is an example of a fastening member is screwed into a lower end of cylindrical part 41B.

Screw 45 has shaft part 45A and flange part 45B. When screw 45 is screwed into cylindrical part 41B, shaft part 45A is inserted into cylindrical part 41B and flange part 45B is brought into contact with the lower end of cylindrical part 41B. Flange part 45B has an outer diameter larger than the outer diameter of cylindrical part 41B so as to protrude outward further than cylindrical part 41B. Retainer 46 is engaged with an area of flange part 45B protruding outward further than cylindrical part 41B.

Retainer 46 has small-diameter cylindrical part 46A and large-diameter cylindrical part 46B. Small-diameter cylindrical part 46A is disposed on large-diameter cylindrical part 46B. A step is formed at an inner peripheral connection portion between small-diameter cylindrical part 46A and large-diameter cylindrical part 46B, and retainer 46 and flange part 45B are brought into contact with and engaged with each other at the step. In this case, small-diameter cylindrical part 46A is fitted to an outer peripheral surface of cylindrical part 41B. Accordingly, when upper dial 4 rotates, retainer 46 rotates integrally with upper dial 4. As illustrated in FIG. 6, a plurality of engagement recesses 46C is formed on the bottom of large-diameter cylindrical part 46B.

Rotation transmission member 47 is disposed below retainer 46. As illustrated in FIG. 5, rotation transmission member 47 has disk part 47A, cylindrical part 47B, and a plurality of engagement pieces 47C. The outer diameter of cylindrical part 47B is smaller than the outer diameter of disk part 47A. Each of the plurality of engagement pieces 47C has a flat plate shape. A lower end of cylindrical part 47B is connected to an upper surface of disk part 47A. The plurality of engagement pieces 47C is connected to the upper surface of disk part 47A and the outer peripheral surface of cylindrical part 47B. The plurality of engagement pieces 47C is insertable into the plurality of engagement recesses 46C (see FIG. 6) of retainer 46. When retainer 46 rotates with the rotation of upper dial 4 with the plurality of engagement pieces 47C being inserted into engagement recesses 46C, rotation transmission member 47 also integrally rotates. An inner peripheral surface of cylindrical part 47B has a D-shaped horizontal section as illustrated in FIG. 5.

Rotary switch 48 is disposed below rotation transmission member 47. Rotary switch 48 has shaft part 48A that can be inserted into cylindrical part 47B of rotation transmission member 47. Shaft part 48A has a D-shaped horizontal section. When rotation transmission member 47 rotates with shaft 48A being inserted into cylindrical part 47B, shaft part 48A integrally rotates. Due to the rotation of shaft part 48A, various modes are switched.

Rotary switch 48 is mounted on substrate 7 by soldering, for example. Substrate 7 is disposed below through-hole 2B (see FIG. 3), and fixed to body case 2. In the exemplary embodiment, substrate 7 includes flexible printed circuit 71 on which a plurality of patterns is formed and sheet metal 72. Sheet metal 72 is attached to a lower surface of flexible printed circuit 71 by means of a double-sided tape (not illustrated), for example. Sheet metal 72 ensures rigidity of substrate 7. Flexible printed circuit 71 and sheet metal 72 are formed with a plurality of through-holes 71A and 72A. Screws 73 which are examples of the fastening member are screwed into body case 2 through through-holes 71A and 72A, whereby substrate 7 is fixed to body case 2. Note that substrate 7 may have a certain level of rigidity. For example, substrate 7 may be a printed circuit board having a plurality of patterns formed on a glass epoxy substrate.

Subsequently, the components related to lower dial 5 will be described.

Lower dial 5 is rotatable about rotation axis R same as the rotation axis of upper dial 4. In the exemplary embodiment, lower dial 5 is rotatable by less than 360 degrees (for example, 270 degrees) about rotation axis R. Lower dial 5 is an exposure correction dial for correcting exposure, for example.

Lower dial 5 has dial member 51, dial cap 52, and double-sided tape 53.

Dial member 51 has annular part 51A having a through-hole (that is, an opening) at the center of a disk, and cylindrical part 51B extending downward from an outer peripheral part of annular part 51A. The centers of annular part 51A and cylindrical part 51B are on rotation axis R. In other words, annular part 51A and cylindrical part 51B are coaxially disposed. Annular part 51A and cylindrical part 51B are disposed around support portion 6.

An upper surface of annular part 51A is attached to a lower surface of dial cap 52 via double-sided tape 53. Thus, dial member 51 and dial cap 52 are integrated. Dial cap 52 has an annular part having a through-hole at the center of a disk, and a cylindrical part extending downward from an outer peripheral part of the annular part. Dial cap 52 is disposed to cover dial member 51. A plurality of numbers (−3 to +3) indicating exposure correction, for example, is printed on an upper surface of dial cap 52 in a circumferential direction.

As illustrated in FIG. 9, annular part 51A has an inner diameter smaller than an inner diameter of dial cap 52. Therefore, inner peripheral part 51Aa of annular part 51A protrudes inward (toward rotation axis R) further than an inner peripheral part of dial cap 52.

Figure 15:
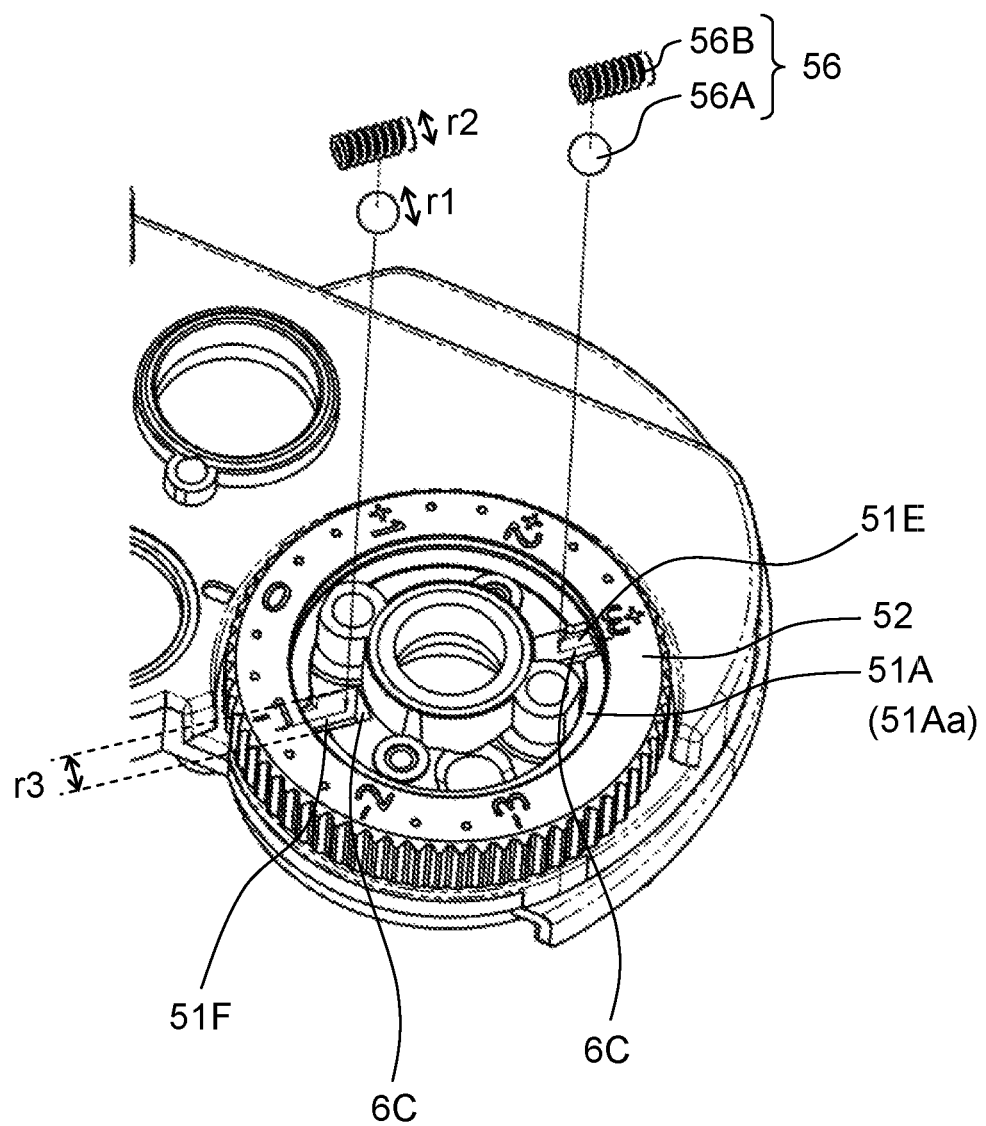
FIG. 15 is a perspective view for describing an assembly operation when a click member is inserted into the lower dial.

As illustrated in FIG. 15, first recess 51E and second recess 51F are formed in inner peripheral part 51Aa of annular part 51A. At portions where first recess 51E and second recess 51F are formed, the diameter of the through-hole of annular part 51A is locally increased. In the exemplary embodiment, first recess 51E and second recess 51F are disposed at positions facing each other across rotation axis R. Retainer 54 illustrated in FIG. 5 is disposed to press inner peripheral part 51Aa of annular part 51A from above.

Retainer 54 has an annular shape. Retainer 54 has a plurality of through-holes 54A. Screws 55 which are examples of the fastening member are screwed into through-holes 6B (see FIG. 5) formed in support portion 6 via through-holes 54A, whereby dial cap 52 is retained. Further, as illustrated in FIGS. 6 and 8, a pair of protrusions 54B is formed on a lower surface of retainer 54. Protrusions 54B are disposed at positions facing each other across rotation axis R. The pair of protrusions 54B is fitted to the pair of grooves 6C.

As illustrated in FIG. 6, corrugated part 51C that has alternate ridges and valleys being continuously formed in the circumferential direction is formed on the inner peripheral surface of cylindrical part 51B. As illustrated in FIG. 8, a pair of click members 56 (examples of a first click member and a second click member) is disposed to be brought into contact with corrugated part 51C. Click members 56 are disposed at positions facing each other across rotation axis R.

Click members 56 provide a click feeling with the rotation of lower dial 5. The click feeling is provided by a change in resistance force with respect to force provided by a user to rotate lower dial 5. Click members 56 are disposed to extend in a direction orthogonal to rotation axis R. More specifically, click members 56 are housed in grooves 6C formed in support portion 6 as illustrated in FIG. 8.

Each click member 56 has ball 56A and spring 56B. Ball 56A is disposed outside of spring 56B. Ball 56A is disposed while being biased from inside by spring 56B so as to be brought into contact with corrugated part 51C in FIG. 6. When lower dial 5 rotates, balls 56A are pressed by corrugated part 51C to move back and forth in a direction orthogonal to rotation axis R. With this back-and-forth motion, biasing force given to balls 56A by springs 56B changes. Thus, click members 56 provide the click feeling to the user.

As illustrated in FIGS. 5 and 6, rotating body 57 is disposed between support portion 6 and substrate 7. Rotating body 57 has inner annular part 57A and outer annular part 57B. Inner annular part 57A and outer annular part 57B are connected to each other with connection part 57C.

As illustrated in FIGS. 7 and 8, rotation transmission member 47 is inserted inside inner annular part 57A in a rotatable manner. Back to FIG. 6, arc-shaped opening part 57D centered around rotation axis R is formed among inner annular part 57A, outer annular part 57B, and connection part 57C. The center angle of opening part 57D is 180 degrees or more (for example, 270 degrees). Boss 63 is inserted into opening part 57D of rotating body 57. As illustrated in FIGS. 6 and 9, screw 74 which is an example of the fastening member is screwed into boss 63 via substrate 7. Thus, support portion 6 is fixed to substrate 7 via boss 63.

Figure 10:
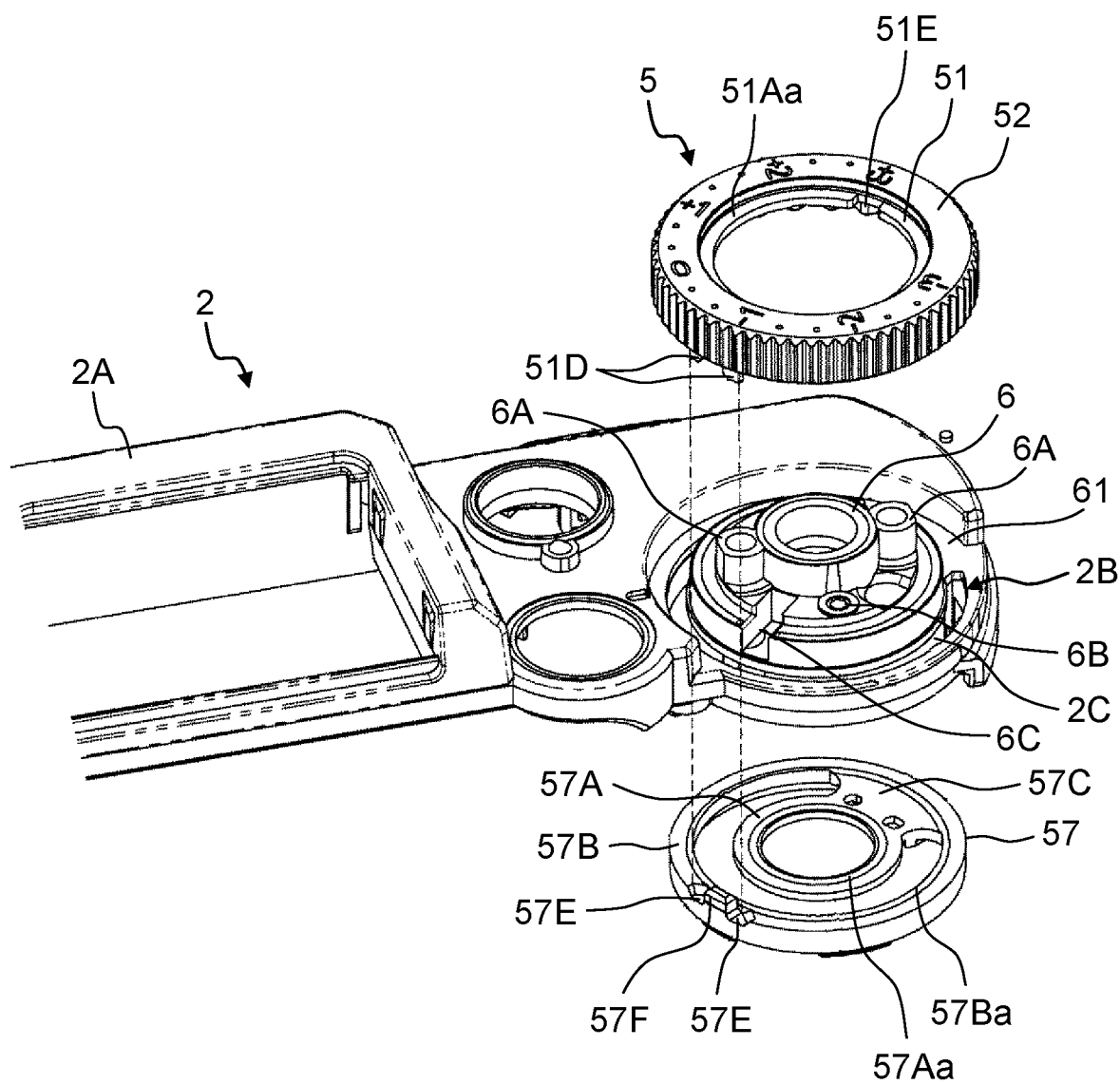
FIG. 10 is an exploded perspective view illustrating a positional relationship among a lower dial, a rotating body, and the support portion.
Figure 11:
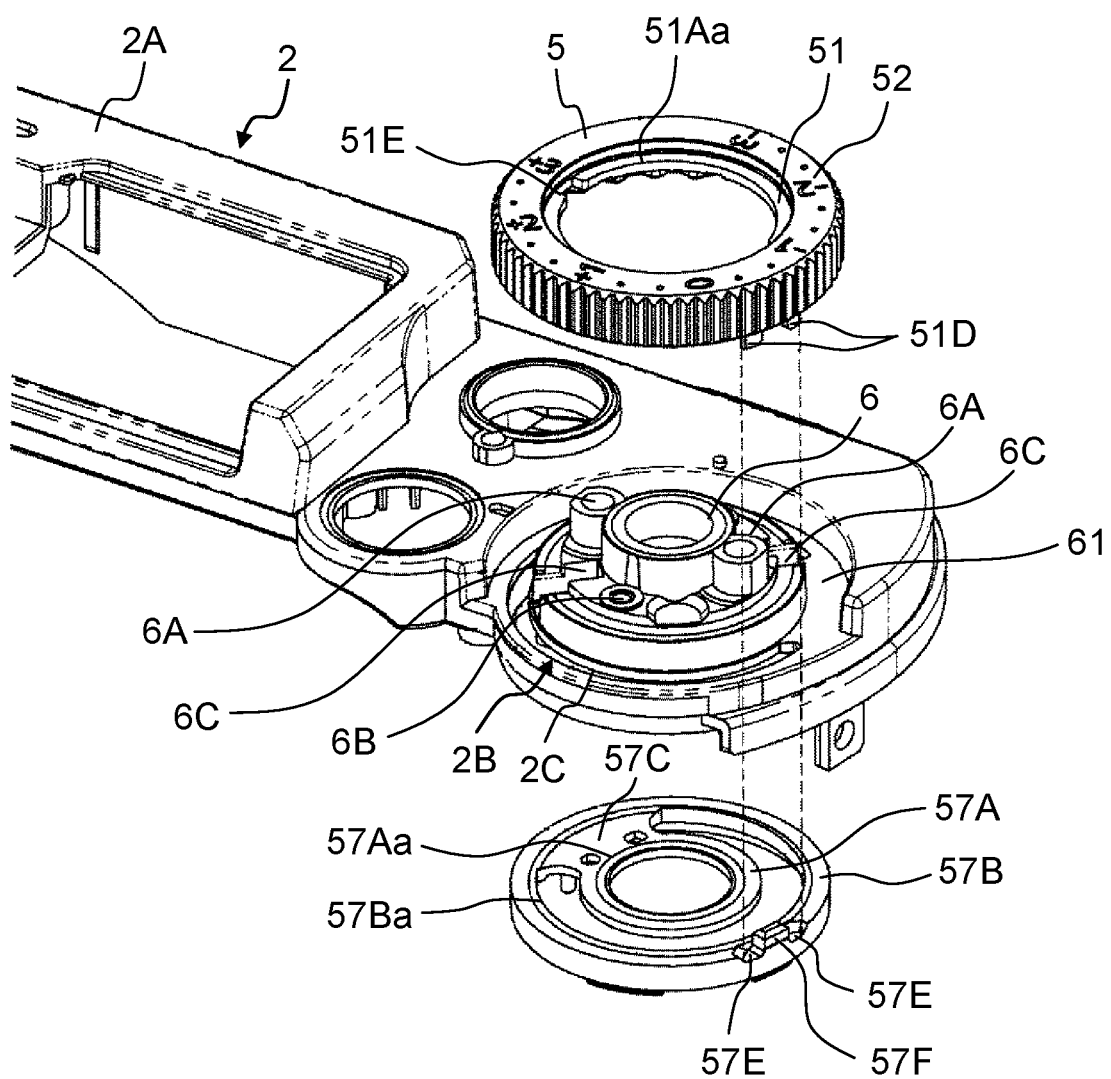
FIG. 11 is an exploded perspective view illustrating a positional relationship among the lower dial, the rotating body, and the support portion.

FIGS. 10 and 11 are exploded perspective views illustrating a positional relationship among lower dial 5, rotating body 57, and support portion 6.

As illustrated in FIGS. 10 and 11, dial member 51 of lower dial 5 has a pair of engagement protrusions 51D which protrudes downward and which is an example of an engaging portion. Outer annular part 57B of rotating body 57 has a pair of engagement recesses 57E which is an example of an engaged portion and which can receive the pair of engagement protrusions 51D. The pair of engagement protrusions 51D is inserted into the pair of engagement recesses 57E through arc-shaped opening portion 2C in body case 2, which enables lower dial 5 and rotating body 57 to integrally rotate about rotation axis R. Note that, as illustrated in FIG. 11, the rotation of lower dial 5 and rotating body 57 is restricted due to contact of one of the pair of engagement protrusions 51D with connection portion 61.

Engagement protrusion 57F protruding upward is formed between the pair of engagement recesses 57E. When engagement protrusion 57F is inserted into an engagement recess (not illustrated) formed between the pair of engagement protrusions 51D, lower dial 5 and rotating body 57 are more reliably engaged with each other.

Annular rib 57Aa is formed on the upper surface of inner annular part 57A. Annular rib 57Ba is formed on the upper surface of outer annular part 57B. When rotating body 57 rotates, rib 57Aa and rib 57Ba are brought into contact with the lower surface of support portion 6, and this can prevent generation of chips, as compared to a configuration where rotating body 57 entirely slides on the lower surface of support portion 6, for example.

Figure 12:
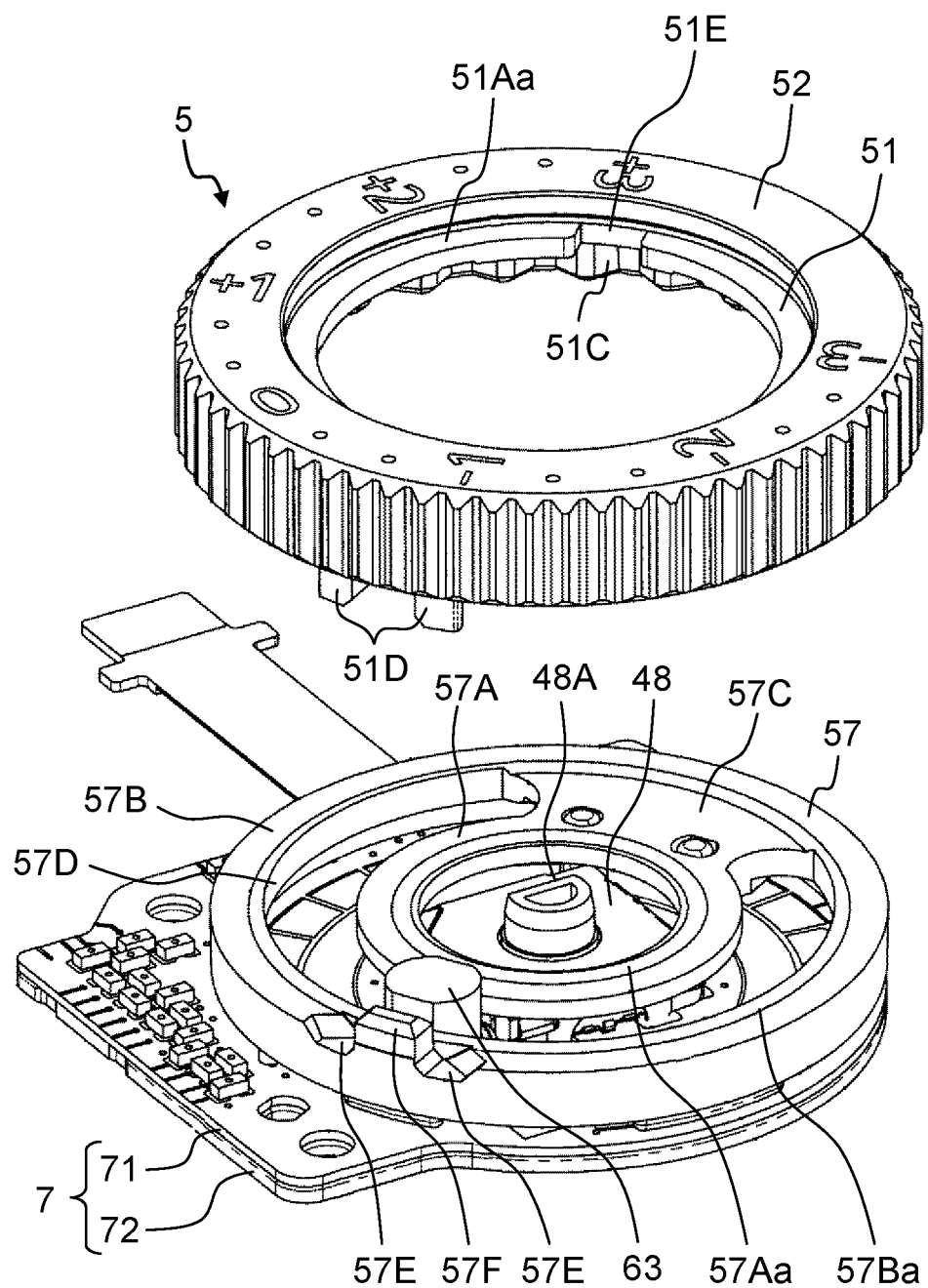
FIG. 12 is an exploded perspective view illustrating a positional relationship among the lower dial, the rotating body, and a substrate.

FIG. 12 is an exploded perspective view illustrating a positional relationship among lower dial 5, rotating body 57, and substrate 7.

As illustrated in FIG. 12, boss 63 is inserted into opening part 57D of rotating body 57. Boss 63 relatively moves in opening part 57D with the rotation of rotating body 57. The pair of engagement recesses 57E and engagement protrusion 57F is provided on a side opposite to connection part 57C across rotation axis R.

Figure 13:
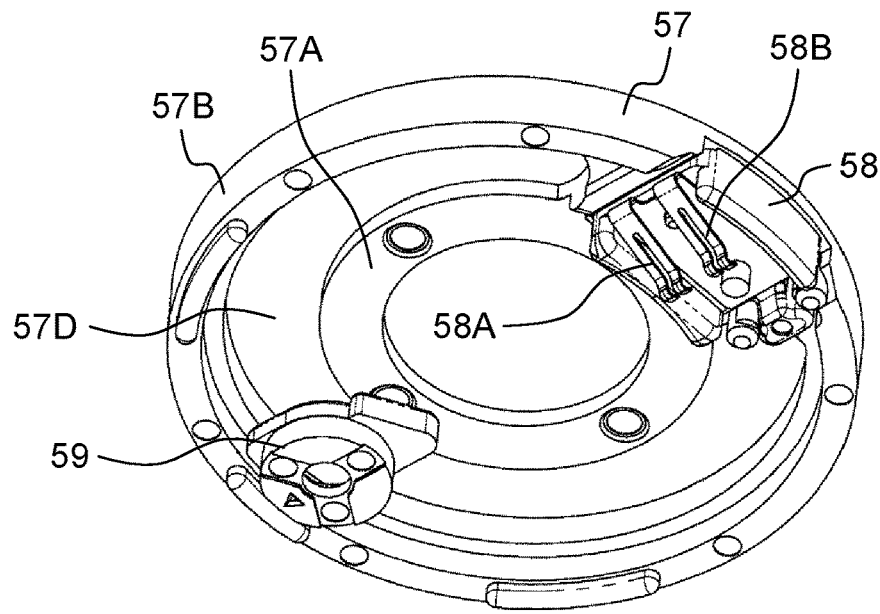
FIG. 13 is a perspective view of the rotating body as viewed from diagonally below.

FIG. 13 is a perspective view of rotating body 57 as viewed from diagonally below.

As illustrated in FIG. 13, contact portion 58 and guide member 59 are mounted to the lower surface of rotating body 57. Contact portion 58 is mounted on the lower surface of connection part 57C of rotating body 57. Contact portion 58 is also provided to protrude downward (in a direction approaching substrate 7) from the lower surface of connection part 57C. Connection part 57C is disposed concentric with opening part 57D. Contact portion 58 has brushes 58A and 58B which are slidable on the patterns formed in substrate 7 when rotating body 57 rotates about rotation axis R. Guide member 59 is mounted to boss 63 for preventing vertical deformation of rotating body 57 to allow rotating body 57 to smoothly rotate.

Figure 14:
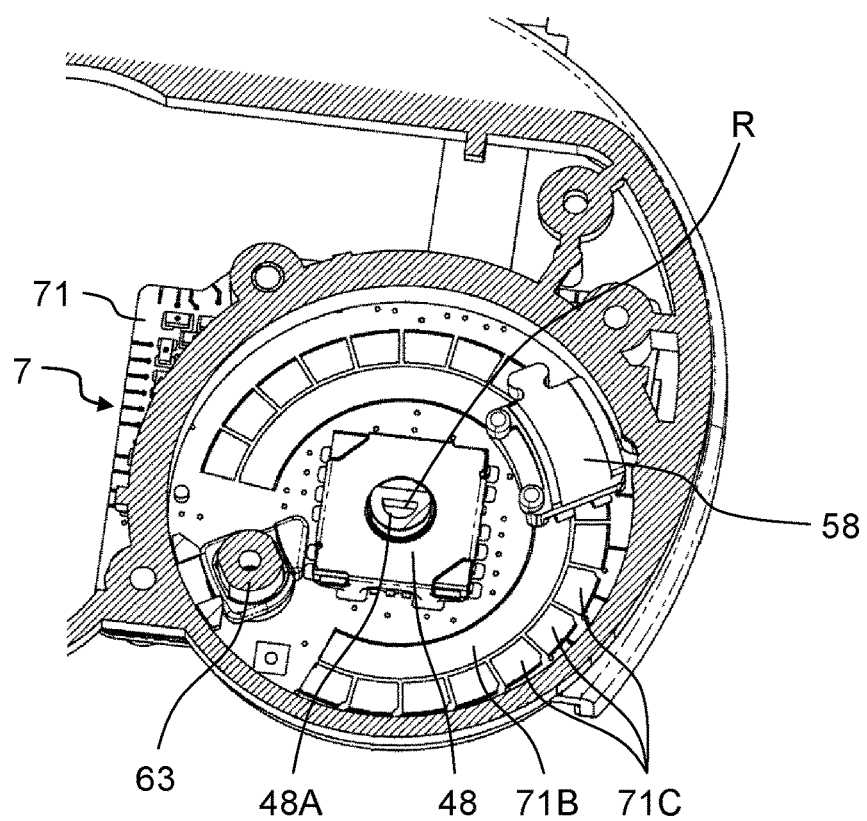
FIG. 14 is a perspective view illustrating a positional relationship among the substrate, a boss, a contact portion, and a rotary switch.

FIG. 14 is a perspective view illustrating a positional relationship among substrate 7, boss 63, contact portion 58, and rotary switch 48.

As illustrated in FIG. 14, first pattern 71B and second pattern 71C which are concentric around rotation axis R are formed in flexible printed circuit 71 so as to surround rotary switch 48 except for a nearby area of boss 63. First pattern 71B and second pattern 71C are formed by gold plating, for example.

First pattern 71B is continuously formed and connected to a ground. Second pattern 71C is discontinuously formed to be segmented into a plurality of areas (for example, 19 areas), and connected to a central processing unit (CPU) (not illustrated). A portion of first pattern 71B and a portion of second pattern 71C are formed at positions overlapping connection portion 61 in a plan view.

Brush 58A (see FIG. 13) of contact portion 58 is provided to slide on first pattern 71B when rotating body 57 rotates about rotation axis R. Brush 58B (see FIG. 13) of contact portion 58 is provided to slide on second pattern 71C when rotating body 57 rotates about rotation axis R. Setting of lower dial 5 (for example, exposure correction) is switched based on the contact position between brush 58B and second pattern 71C.

A method for assembling click member 56 will now be described with reference to FIG. 15. In the exemplary embodiment, lower dial 5 is firstly disposed on support portion 6. When doing so, an assembly worker places lower dial 5 such that one of grooves 6C in support portion 6 is connected to first recess 51E of lower dial 5 and other groove 6C is connected to second recess 51F.

With lower dial 5 being disposed as described above, ball 56A is inserted into groove 6C. Then, spring 56B is pushed into groove 6C. In this case, the lengths of grooves 6C open to the outside are extended by first recess 51E and second recess 51F. Therefore, the assembly worker can easily insert spring 56B by pushing while slightly bending spring 56B.

When spring 56B is inserted, ball 56A is pushed by spring 56B to be brought into contact with valleys of corrugated part 51C formed on the inner peripheral surface of cylindrical part 51B.

Thereafter, retainer 54 illustrated in FIG. 8 is disposed from above. Retainer 54 is disposed such that protrusions 54B on the lower surface are fitted into grooves 6C. This configuration prevents springs 56B and balls 56A from jumping out.

In the exemplary embodiment, diameter r1 of ball 56A and diameter r2 of spring 56B are slightly smaller than width r3 of groove 6C. Further, widths of first recess 51E and second recess 51F are substantially equal to r3 which is the width of groove 6C.

In the exemplary embodiment, support portion 6 is connected to body case 2 via connection portion 61 in a cantilever fashion. Further, support portion 6 is fixed to substrate 7 via boss 63 provided to protrude downward from free end 62. With this configuration, free end 62 is fixed to substrate 7 via boss 63, whereby support portion 6 can be downsized as compared to a configuration where both ends are screwed to body case 2, for example. In addition, the configuration of the exemplary embodiment can more reliably prevent rattling of upper dial 4 and lower dial 5 with respect to body case 2, as compared to a configuration without having connection portion 61.

In the exemplary embodiment, body case 2 and support portion 6 are integrally formed from a resin material. With this configuration, rattling of upper dial 4 and lower dial 5 with respect to body case 2 can further be reduced. Moreover, this configuration facilitates assembly.

When boss 63 is provided at free end 62, patterns cannot be formed in substrate 7 near boss 63. Further, contact portion 58 needs to move while avoiding the nearby area of boss 63 so as not to be brought into contact with boss 63.

To address such a situation, in the exemplary embodiment, rotating body 57 is provided between support portion 6 and substrate 7. When rotating body 57 rotates integrally with lower dial 5, contact portion 58 mounted to rotating body 57 slides on the patterns of substrate 7. With this configuration, contact portion 58 can be disposed at a position not being brought into contact with boss 63 due to rotating body 57.

In the exemplary embodiment, a portion of the patterns of substrate 7 is formed at a position overlapping connection portion 61 in a plan view. With this configuration, a range where the patterns of substrate 7 and contact portion 58 are brought into contact with each other can be expanded, whereby a range in which the setting of lower dial 5 can be changed can be increased (not less than 180 degrees).

In addition, in the exemplary embodiment, arc-shaped opening part 57D centered around rotation axis R is formed in rotating body 57, and boss 63 relatively moves in opening part 57D with the rotation of rotating body 57. This configuration can prevent boss 63 from interfering with the rotation of rotating body 57.

In addition, in the exemplary embodiment, rotating body 57 has connection part 57C disposed concentric with opening part 57D. Further, contact portion 58 is provided to protrude downward from the lower surface of connection part 57C. With this configuration, boss 63 relatively moves in opening part 57D, whereby the contact between contact portion 58 and boss 63 can more reliably be prevented.

In the exemplary embodiment, the lower dial has the pair of engagement protrusions 51D (an example of the engaging portion). Rotating body 57 has the pair of engagement recesses 57E (an example of the engaged portion) formed on the side opposite to contact portion 58 across rotation axis R. Engagement protrusions 51D and engagement recesses 57E are engaged with each other through arc-shaped opening portion 2C. With this configuration, rotating body 57 and lower dial 5 can be integrally rotated within a range of the center angle of opening portion 2C.

In the exemplary embodiment, click members 56 are provided that provide the click feeling with the rotation of lower dial 5. Click members 56 extend in the direction orthogonal to rotation axis R and are provided to be brought into contact with the inner peripheral surface of lower dial 5. With this configuration, an increase in height of the two-stage dial can be reduced.

Expressing the exemplary embodiment from another aspect, the imaging device according to the exemplary embodiment includes body case 2, support portion 6, lower dial 5, upper dial 4, and click member 56 (an example of the first click member). Click member 56 extends in the direction orthogonal to the rotation axis. Click member 56 provides the click feeling with the rotation of lower dial 5.

Lower dial 5 has annular part 51A having an opening, and cylindrical part 51B extending downward from an outer peripheral part of annular part 51A. First recess 51E is formed in inner peripheral part 51Aa of annular part 51A such that the diameter of the opening is locally increased.

Groove 6C (an example of the first groove) is formed in the upper surface of support portion 6. Click member 56 is housed in groove 6C so as to be brought into contact with the inner peripheral surface of cylindrical part 51B of lower dial 5.

Thus, click member 56 can be disposed after lower dial 5 is disposed. Specifically, if first recess 51E is not formed, the length of groove 6C open to the outside with lower dial 5 being disposed is short due to the presence of inner peripheral part 51Aa of annular part 51A. Therefore, it is difficult to insert spring 56B from above with lower dial 5 being disposed. In view of this, the assembly worker places ball 56A and spring 56B before placing lower dial 5. It is difficult to place lower dial 5 with ball 56A and spring 56B being placed at desired positions.

On the other hand, in the exemplary embodiment, first recess 51E is formed, whereby the length of groove 6C open to the outside with lower dial 5 being disposed is extended. Therefore, spring 56B can be easily inserted with lower dial 5 being disposed. Further, the position of ball 56A is fixed due to corrugated part 51C of lower dial 5, whereby ball 56A is easily positioned. From the above, the exemplary embodiment provides easy assembly. Further, click member 56 can be disposed to extend in the direction orthogonal to rotation axis R, whereby the height of lower dial 5 can be reduced. That is to say, two-stage dial 3 can be downsized.

A number of click members 56 may be two or more. The number of click members 56 and numbers of grooves 6C and recesses may be equal to each other. For example, if two click members 56 are provided, imaging device 1 may have a pair of grooves 6C, first recess 51E, and second recess 51F. Second recess 51F may be formed in inner peripheral part 51Aa of annular part 51A such that the diameter of the opening of annular part 51A is locally increased. Second click member 56 may be housed in second groove 6C so as to be brought into contact with the inner peripheral surface of cylindrical part 51B of lower dial 5. Thus, easy assembly of lower dial 5 and reduction in the height of lower dial 5 can be achieved.

The pair of grooves 6C may be formed at positions facing each other across rotation axis R, and first recess 51E and second recess 51F may be formed at positions facing each other across rotation axis R. The positions facing each other across rotation axis R indicate positions with a center angle of 180°±15° about rotation axis R. When the pair of grooves 6C is formed at positions facing each other across rotation axis R, the pair of click members 56 housed in the pair of grooves 6C is also provided at positions facing each other across rotation axis R. Therefore, biasing force of springs 56B of click members 56 is offset as a whole, whereby displacement of support portion 6 can be prevented.

Width r3 of first recess 51E is set larger than the width of click member 56 (that is, diameter r1 of ball 56A and diameter r2 of spring 56B), whereby workability is improved. In other words, the worker can easily insert ball 56A and spring 56B into groove 6C.

Similarly, width r3 of second recess 51F may be larger than the width of click member 56.

Retainer 54 may be disposed over the opening of annular part 51A. Protrusions 54B to be fitted into grooves 6C may be formed on the lower surface of retainer 54. A number and position of protrusions 54B may be set according to the position and number of grooves 6C. This configuration prevents springs 56B and balls 56A from jumping out.

In addition, imaging device 1 may have click member 44 (an example of a third click member). Click member 44 extends in the vertical direction. Click member 44 provides a click feeling with the rotation of upper dial 4. A vertical space between upper dial 4 and a lower part of support portion 6 is wider than a vertical space between lower dial 5 and the lower part of support portion 6. Thus, click member 44 of upper dial 4 is provided to extend in the vertical direction, whereby effective use of space is achieved.

Note that the present disclosure is not limited to the above exemplary embodiment, and various modifications are possible. For example, rotating body 57 and contact portion 58 are separately provided in FIG. 1. However, the present disclosure is not limited thereto. For example, rotating body 57 and contact portion 58 may be integrated as a single member.

In addition, although the rotation of lower dial 5 and rotating body 57 is restricted due to contact between one of engagement protrusions 51D and connection portion 61 in the above exemplary embodiment, the present disclosure is not limited thereto. For example, the rotation of lower dial 5 and rotating body 57 may be restricted due to contact between boss 63 and connection part 57C of rotating body 57.

The exemplary embodiment has been described herein as an illustrative example of the technique in the present disclosure. The accompanying drawings and the detailed description have been provided for this purpose. Accordingly, components appearing in the accompanying drawings and the detailed description include not only the components essential for solving the technical problems set forth herein, but also the components that are not essential for solving the technical problems but are merely used to illustrate the technique described herein. It should not be therefore determined that the unessential components in the accompanying drawings and the detailed description are essential only based on the fact that these components are included in the drawings and the description.

The above exemplary embodiment has been provided to exemplify the technique according to the present disclosure, and various changes, replacements, additions, omissions, and the like can be made within the scope of the claims and equivalents thereof.

The imaging device according to the present disclosure can prevent rattling of an upper dial and a lower dial with respect to a body case, and thus, is useful not only for a digital camera but also for an imaging device equipped with a two-stage dial having a vertical two-stage structure.

What is claimed is:

1. An imaging device comprising:
   a body case formed with a through-hole that extends in a vertical direction;
   a substrate that is disposed below the through-hole and fixed to the body case;
   a support portion disposed inside the through-hole;
   a lower dial supported to the support portion so as to be rotatable about a rotation axis parallel to the vertical direction; and
   an upper dial disposed over the lower dial and supported to the support portion so as to be rotatable about the rotation axis independently of the lower dial,
   wherein
   the support portion includes
      a connection portion within the through-hole that constitutes a part of an outer periphery of the support portion and is connected to the body case, and
      a fixing portion that is disposed to protrude downward on a side opposite to the connection portion across the rotation axis,
      the support portion is fixed to the substrate via the fixing portion.

2. The imaging device according to claim 1, wherein the body case and the support portion are integrally formed from a resin material.

3. The imaging device according to claim 1, further comprising a rotating body that is disposed between the support portion and the substrate and rotates integrally with the lower dial about the rotation axis,
   wherein
   the rotating body has a contact portion that is slidable on a pattern formed in the substrate when the rotating body rotates about the rotation axis.

4. The imaging device according to claim 3, wherein a portion of the pattern is formed at a position overlapping the connection portion in a plan view.

5. The imaging device according to claim 4, wherein
   the lower dial has an engaging portion,
   the rotating body has an engaged portion provided on a side opposite to the contact portion across the rotation axis, and
   the engaging portion and the engaged portion are engaged with each other through an arc-shaped opening portion that is a part of the through-hole and that is formed around an outer periphery of the support portion except for the connection portion of the support portion.

6. The imaging device according to claim 3, wherein the rotating body has an arc-shaped opening part centered around the rotation axis, and the fixing portion relatively moves in the arc-shaped opening part with the rotation of the rotating body.

7. The imaging device according to claim 6, wherein the rotating body includes a connection part disposed concentric with the arc-shaped opening part, and the contact portion is provided to protrude downward from a lower surface of the connection part of the rotating body.

8. The imaging device according to claim 1, further comprising a click member that provides a click feeling with the rotation of the lower dial,
   wherein
   the click member extends in a direction orthogonal to the rotation axis so as to be brought into contact with an inner peripheral surface of the lower dial.

9. An imaging device comprising:
   a body case formed with a through-hole that extends in a vertical direction;
   a support portion disposed inside the through-hole;
   a lower dial supported to the support portion so as to be rotatable about a rotation axis parallel to the vertical direction;
   an upper dial disposed over the lower dial and supported to the support portion so as to be rotatable about the rotation axis independently of the lower dial; and
   a first click member that is movable in a direction orthogonal to the rotation axis and provides a click feeling with the rotation of the lower dial,
   wherein
   the lower dial has an annular part having an opening, and a cylindrical part extending downward from an outer peripheral part of the annular part, the annular part being formed with a first recess in an inner peripheral part for locally increasing a diameter of the opening,
   the support portion is formed with a first groove in an upper surface, and
   the first click member is housed in the first groove so as to be brought into contact with an inner peripheral surface of the cylindrical part of the lower dial.

10. The imaging device according to claim 9, further comprising a second click member that extends in the direction orthogonal to the rotation axis and provides a click feeling with the rotation of the lower dial,
    wherein
    the lower dial is formed with a second recess in the inner peripheral part of the annular part for locally increasing the diameter of the opening,
    the support portion is formed with a second groove in the upper surface, and
    the second click member is housed in the second groove so as to be brought into contact with the inner peripheral surface of the cylindrical part of the lower dial.

11. The imaging device according to claim 10, wherein
the first groove and the second groove are formed at positions facing each other across the rotation axis, and
the first recess and the second recess are formed at positions facing each other across the rotation axis.

12. The imaging device according to claim 9, wherein the first recess has a width larger than a width of the first click member.

13. The imaging device according to claim 9, wherein
a retainer is disposed over the opening of the annular part, and
the retainer has, on a lower surface, a protrusion to be fitted into the first groove.

14. The imaging device according to claim 9, further comprising a third click member that extends in the vertical direction and provides a click feeling with the rotation of the upper dial.

\* \* \* \* \*